(12) United States Patent
Cok et al.

(10) Patent No.: US 7,847,764 B2
(45) Date of Patent: Dec. 7, 2010

(54) LED DEVICE COMPENSATION METHOD

(75) Inventors: Ronald S. Cok, Rochester, NY (US);
Felipe A. Leon, Rochester, NY (US);
John E. Ludwicki, Churchville, NY (US)

(73) Assignee: Global OLED Technology LLC, Wilmington, DE (US)

( * ) Notice: Subject to any disclaimer, the term of this patent is extended or adjusted under 35 U.S.C. 154(b) by 878 days.

(21) Appl. No.: 11/686,642

(22) Filed: Mar. 15, 2007

(65) Prior Publication Data
US 2008/0224966 A1 Sep. 18, 2008

(51) Int. Cl.
G09G 3/30 (2006.01)
G09G 3/10 (2006.01)
(52) U.S. Cl. .................. 345/77; 345/78; 315/169.3
(58) Field of Classification Search ........... 345/55–102, 345/204–214, 77, 78, 82; 315/149–159, 315/169.3
See application file for complete search history.

(56) References Cited

U.S. PATENT DOCUMENTS

| | | | |
|---|---|---|---|
| 6,414,661 B1 | 7/2002 | Shen et al. | |
| 6,456,016 B1 | 9/2002 | Sundahl et al. | |
| 6,504,565 B1 | 1/2003 | Narita et al. | |
| 6,995,519 B2 | 2/2006 | Arnold et al. | |
| 7,161,566 B2 | 1/2007 | Cok et al. | |
| 2002/0016474 A1 | 2/2002 | Weber et al. | |
| 2003/0071821 A1 | 4/2003 | Sundahl et al. | |
| 2005/0110728 A1 | 5/2005 | Cok | |
| 2006/0186819 A1* | 8/2006 | Young | 315/158 |

FOREIGN PATENT DOCUMENTS

| | | |
|---|---|---|
| EP | 1 225 557 | 4/2000 |
| JP | 2002-278514 | 9/2002 |

* cited by examiner

Primary Examiner—Bipin Shalwala
Assistant Examiner—Sosina Abebe
(74) Attorney, Agent, or Firm—Morgan Lewis & Bockius LLP

(57) ABSTRACT

A method for controlling and compensating aging in an LED device includes measuring a performance change in light output of the LED device. The LED device is controlled with a first compensation algorithm derived from the measured performance change, during a first period, to effect a luminance change over time in the light output of the LED device. Subsequently, a second compensation algorithm, derived from the measured performance change, and different from the first compensation algorithm, during a second period, effects a second luminance change over time in the LED device's light output. The second luminance change over time in the second period is different from the first luminance change over time in the first period. Furthermore, the first and second periods together are less than the lifetime of the LED device.

19 Claims, 11 Drawing Sheets

LED DEVICE COMPENSATION METHOD

FIELD OF THE INVENTION

The present invention relates to LED devices and more particularly to methods for compensating and controlling the aging of such devices.

BACKGROUND OF THE INVENTION

Solid-state light emitting diode (LED) image display devices are of great interest as a superior flat-panel display technology. These displays utilize current passing through thin films of organic or inorganic material to generate light. The color of light emitted and the efficiency of the energy conversion from current to light are determined by the composition of the thin-film material. Different materials emit different colors of light and may be employed in different light-emitting elements to form a full-color display. However, as the display is used, the materials in the light-emitting elements deteriorate and become less efficient at emitting light. This deterioration reduces the lifetime of the display. The differing materials may age at different rates, causing differential color aging and a display whose white point varies as the display is used. In alternative LED displays, a common white-light emitter is used for all light-emitting elements and a color filter supplied with each light-emitting element to provide a full-color display. In this case, each light-emitting element may age at the same rate, if all of the differently colored light-emitting elements are used equally.

Referring to FIG. 7, a graph illustrating the typical light output of a prior-art OLED display device as current is passed through the OLEDs is shown. The three curves represent typical change in performance of red, green and blue light emitters over time. As can be seen by the curves, the decay in luminance between the differently colored light emitters is different. Hence, in conventional use, with no aging compensation, as current is applied to each of the differently colored OLEDs, the display will become less bright and the color, in particular the white point, of the display will shift.

A variety of methods for measuring or predicting the aging of the OLED materials in displays are known in the art. For example, U.S. Pat. No. 6,456,016 issued Sep. 24, 2002 to Sundahl et al., titled "Compensating Organic Light Emitting Displays" relies on a controlled increase in current provided at an early stage of device use followed by a second stage in which the display output is gradually decreased. U.S. Pat. No. 6,414,661 entitled "Method And Apparatus For Calibrating Display Devices And Automatically Compensating For Loss In Their Efficiency Over Time" issued Jul. 2, 2002 to Shen et al, describes a method and associated system that compensates for long-term variations in the light-emitting efficiency of individual organic light emitting diodes (OLEDs) in an OLED display device, by calculating and predicting the decay in light output efficiency of each pixel, based on the accumulated drive current applied to the pixel; and derives a compensation coefficient that is applied to the next drive current for each pixel. US Published Patent Application No. 2002/0167474 "Method Of Providing Pulse Amplitude Modulation For OLED Display Drivers", published Nov. 14, 2002 by Everitt describes a pulse width modulation driver for an organic light emitting diode display. One embodiment of a video display comprises a voltage driver for providing a selected voltage to drive an organic light emitting diode in a video display. The voltage driver may receive voltage information from a compensation table that accounts for aging, column resistance, row resistance, and other diode characteristics. U.S. Pat. No. 6,995,519 entitled, "OLED Display with Aging Compensation" issued Feb. 7, 2006 to Arnold et al. describes measuring the voltage across each OLED in a display to produce feedback signals that may be employed to calculate a compensation signal to compensate for changes in the output of each OLED.

U.S. Pat. No. 6,504,565 entitled, "Light-Emitting Device, Exposure Device, And Image Forming Apparatus", issued Jan. 7, 2003 to Narita et al describes a light-emitting device which includes a light-emitting element array formed by arranging a plurality of light-emitting elements, a driving unit for driving the light-emitting element array to emit light from each of the light-emitting elements, a memory unit for storing the number of light emissions for each light-emitting element of the array, and a control unit for controlling the driving unit based on the information stored in the memory unit so that the amount of light emitted from each light-emitting element is held constant.

JP 2002/278514 A entitled, "Electro-Optical Device" and published Sep. 27, 2002 by Koji describes a method in which a prescribed voltage is applied to organic EL elements by a current-measuring circuit and the current flows are measured. A temperature measurement circuit estimates the temperature of the organic EL elements.

Referring to FIG. 8, prior-art systems providing aging compensation to OLED displays typically include a display 30 for displaying images. The display 30 is controlled by a controller 32 that receives image or data signals 34 from an external device. The image or data signals 34 are converted into the appropriate control signals 36 using conversion circuitry 38 within the controller 32 and applied to the display 30. A performance attribute of the display, for example, the current or voltage within the display 30, is measured and a feedback signal 40 is supplied through a measurement circuit 42 and provided to the controller 30. The controller then uses the measured feedback signal 40 to change the control signals 36 to compensate for any aging detected in the display 30.

The measurement circuit 42 may be incorporated into the display 30, into the controller 32, or may be a separate circuit 42 (as shown). Likewise, the feedback signal may be detected within the display (as shown) or measured externally by the controller 32 or some other circuit. For example, the luminance of the display 32 may be measured by an external photo-sensor or camera or be detected by photosensors on the display itself.

In some prior art embodiments, the feedback signal 40 is not produced by the display 30, but is produced by analyzing the control signals 36 input to the display 30. For example, a useful feedback signal known in the prior art is the accumulation of current provided to the display 30. Since aging depends on total current passed through a display, a measurement of the accumulated current can be used to predict the aging of the display 30. Alternatively, the luminance signal sent to the display 30 as part of the control signals 36 may be accumulated over time to provide the feedback signal 40. A knowledge of the intended luminance of the display 30 can be used to predict aging and then the effects of aging can be compensated. Although a continuous compensation of aging is possible in some of these configurations, compensations are often applied periodically so as not to interfere with the use of the device.

In another aging compensation method described in U.S. Pat. 7,161,566 entitled, "OLED Display with Aging Compensation" issued Jan. 9, 2007 to Cok, a current-measuring device is employed to sense the current used by the display device to produce a current signal that is employed to calculate a compensation signal.

It is preferable that any changes made to the display be imperceptible to a user and represent the best possible compromise between brightness, color, and power usage. Since displays are typically viewed in a single-stimulus environment, slow changes over time are acceptable, but large, noticeable changes are objectionable. Since continuous, real-time compensations are usually not practical because they interfere with the operation of the LED device, most changes in LED device compensation are done periodically. Hence, if an LED device output changes significantly during a single period, a noticeably objectionable compensation to the appearance of the display may result. US Application Publication 2005/110728 entitled, "A Method of Aging Compensation in an OLED Display" by Cok describes a method for controlling aging compensation in an OLED display having one or more light-emitting elements comprising the steps of periodically measuring the change in display output to calculate a compensation signal; restricting the change in the compensation signal at each period; and applying the compensation signal to the OLED display to effect a compensation in the display output. This technique reduces the perceptibility of compensation changes in an OLED display, but does not address the tradeoff between luminance, power, and lifetime inherent in such an OLED display.

All of the methods described above change the output of the LED display to compensate for changes in the LED light-emitting elements. The various prior-art aging compensation methods described above are useful in providing compensation, but do not teach methods for controlling or limiting the compensation. While maintenance of a display at a given luminance and white point is a useful goal, in many applications an alternative compensation may be preferred.

Applicants have found that the maintenance of an LED device at a constant luminance may be impractical. For most display devices, it is preferred to initially employ the device at a maximum luminance, but this maximum luminance may not be required throughout the lifetime of the display device. Moreover, in some circumstances, a minimum power requirement may be preferred. Since increasing the luminance of an LED device requires increasing the power employed, other factors, such as battery lifetime in a portable electronic display device (for example, cell phones, personal video or audio players, and the like) may become more critical performance attributes than the luminance of the display. In any case, there is a limit to the amount of power that a display may dissipate, so that constant luminance may not be achieved.

There is a need, therefore, for an improved aging compensation method for light-emitting diode devices.

SUMMARY OF THE INVENTION

The aforementioned need is met by providing a method for controlling and compensating aging in an LED device that includes measuring a performance change in light output of the LED device. The LED device is controlled with a first compensation algorithm derived from the measured performance change, during a first period, to effect a luminance change over time in the light output of the LED device. Subsequently, a second compensation algorithm, derived from the measured performance change, and different from the first compensation algorithm, during a second period, effects a second luminance change over time in the LED device's light output. The second luminance change over time in the second period is different from the first luminance change over time in the first period. Furthermore, the first and second periods together are less than the lifetime of the LED device.

ADVANTAGES

An advantage of this invention is that it provides a compensation method that accommodates the need for improved performance with limited display luminance, power use, and lifetime.

DETAILED DESCRIPTION OF THE INVENTION

Figure 1:
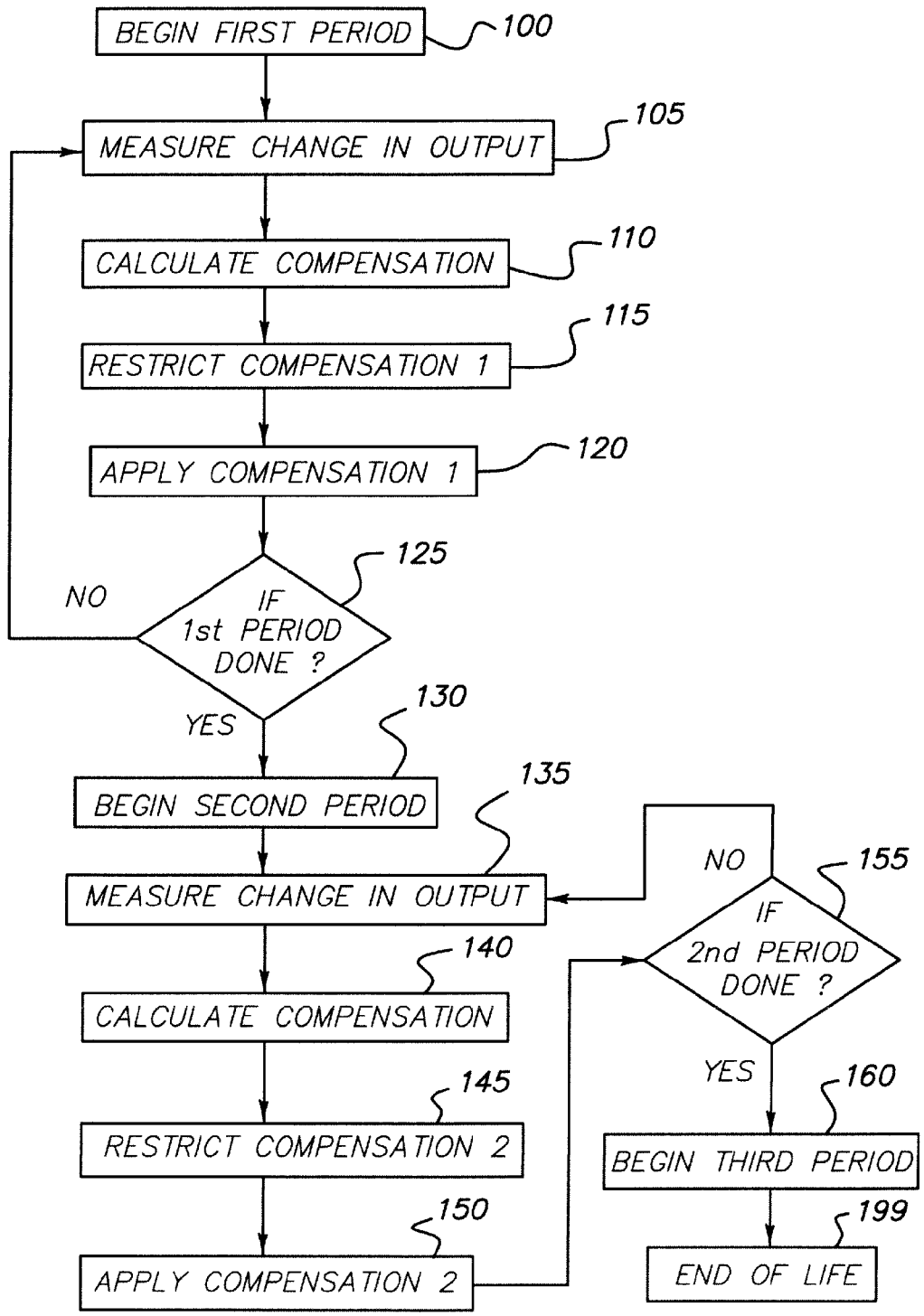
FIG. 1 is a flow chart illustrating an embodiment of the method of the present invention.

Referring to FIG. 1, according to one embodiment of the present invention, a method for controlling and compensating aging in an LED device comprises the steps of initializing 100 a first period, and measuring 105 the change in display output to calculate 110 a compensation signal. By employing a first algorithm to determine the desired compensation, the compensation may be restricted 115 to a first compensation during the first period and applied 120 to the LED device during the first period to effect a first compensation in the display output. The first period status may be tested 125 to determine whether to continue with the first period restriction by comparing the LED device performance to a first criterion. If it is determined to continue with the first period restriction, the process of measurement 105, compensation calculation 110, restricting 115 the compensation, and applying 120 the compensation is repeated. If not, a second period is begun 130. In this second period, a similar process of measurement 135, compensation calculation 140, employing a second algorithm different from the first algorithm to determine the desired second compensation by restricting 145 the compensation to a compensation different from the restriction of the first restriction, and applying 150 the compensation to effect a second compensation in the device's output is performed. The second period status may be tested 155 to determine whether to continue with the second period compensation by comparing the LED device's performance to a second criterion. If so, the process of measurement 135, compensation calculation 140, restricting the compensation 145, and applying 150 the compensation is repeated. If not, a third period is established in step 160. The first and second periods together are less than the lifetime of the LED device, so that the lifetime of the LED device has at least three, and possibly more, periods, at least two of which are managed using two different compensation algorithms. While in some embodiments of the present invention, the compensation necessary to maintain the LED device at a constant average luminance may be employed in one of the periods; in other embodiments the compensations allow a gradual decrease in average luminance. It is preferred that any change in average luminance, or change in compensation, be imperceptible, whether instantaneously or phased in over time, to a viewer.

In a third period, in one embodiment of the present invention, no measurement or compensation may be applied and the device will age until it fails 199, for example by outputting less than 50% of the initially rated light output. In an alternative embodiment of the present invention, a third period of measurement and compensation may be employed until a third criterion is met and the device is allowed to fail without providing further compensation. In yet another embodiment of the present invention, compensation is employed until the LED device fails.

According to various embodiments of the present invention, the LED device may be a display device or an area illumination device such as a lamp. In one embodiment, the LED device may be an organic LED (OLED) device and employ organic electro-luminescent or photo-luminescent materials as are known in the art. Alternatively, the LED device may be an inorganic LED device employing quantum dots. Such quantum dots are also known in the art.

The criterion defining the lifetime of the LED device may be arbitrarily specified and typically depends on the application of the device. For example, in a display application, the lifetime of the LED device may be specified as the time the device emits light at more than 50% of its initially specified luminance at a given current or power or until the system in which the LED device is incorporated can no longer maintain the average luminance of the LED device at a level greater than 50% of the initial luminance. In an area illumination application, the LED device may be employed as a lamp and its lifetime may be specified as the time the lamp can be illuminated at a luminance greater than, for example, 50% of its initially rated luminance.

A variety of means may be employed to measure changes in the LED device output, for example, including the light output from the LED device, a current used by the LED device; a voltage across a light emitting element of the LED device, an accumulation over time of the use of current by the LED device, an accumulation of drive signal values or an accumulation of samples of drive signal values provided to the LED device, an accumulation of the time that the LED device is in use, and a temperature of the display. Means to measure these attributes of an LED device are known in the prior art. Likewise, the compensation signal can be provided by adjusting a voltage applied to the display, a voltage applied to each pixel, a charge applied to each pixel, or a data value applied to each pixel. The different light-emitters emitting light of different colors of a full-color LED device may employ different compensations for each color of light-emitter. Moreover, different compensations may be applied at different luminance levels. A variety of means may be employed to provide the compensation value, for example by employing a lookup table that specifies a control value for the LED device, for example a voltage level.

As shown in the flow diagram of FIG. 1, the performance of the LED device may be repeatedly measured over time. However, in various embodiments of the present invention, the performance may be measured at a plurality of times or a single time, for example, at fixed time intervals, after predetermined periods of use, continuously, or only once in one or more periods. Likewise, a variety of criteria may be employed to determine the end of the first and second periods. For example, a nominal luminance performance, for example, 80% of the initial luminance, may be employed to determine the end of a period, for example, the first period. Alternatively, a driving voltage, current, or power limit or percent increase may be employed to specify the end of a period, for example, the second period. Likewise, the compensation signal may be updated once or a plurality of times.

In any real system, there are limitations on the amount of current, voltage, or power that may be provided to drive the LED device. Increased current, voltage, or power may be provided to the LED device up to the system limitations. At that point, further compensation is not possible. Hence, in one embodiment of the present invention, the compensation provided in the first period may allow the luminance of the LED device to slowly decline to a pre-determined level and at a first rate, for example decreased to 70% of initial luminance, as the current, voltage, or power employed to drive the LED light-emitting elements slowly increases. When luminance output reaches the pre-determined level, the second period begins and luminance output is maintained at a second rate, for example, at the pre-determined level until the current, voltage, or power employed reaches the maximum designed for the system. At that point, the second period is complete and the LED device can be allowed to decrease in luminance without further compensation until it reaches the designed end of life, for example, when luminance reaches 50% of the initial luminance. Alternatively, luminance may be allowed to decrease, but at a more gradual rate than would have occurred without compensation during the second period. In alternative embodiments, a three-stage lifetime management scheme may be employed during which, an accelerated rate of luminance decrease is permitted but at a still slower rate than would have occurred without compensation management. In this design, the end of the second period may occur before the maximum current, voltage, or power system limitation is reached.

In some embodiments of the present invention, the current, voltage, or power supplied to the LED device monotonically increases to a maximum. However, applicants have determined that it can be advantageous to actually decrease the current, voltage, or power supplied to the LED device at certain points in the device's lifecycle; thereby, decreasing the average luminance of the LED device more rapidly than would be the case with no compensation. Applicants have also determined that it can be advantageous to employ a compensation signal that restricts the current, voltage, or power supplied to the LED device to less than that necessary to maintain a constant luminance in one or more periods.

The present invention provides an improvement over the prior art in that luminance of the LED device can be proactively controlled to provide customers with a desired lifetime and acceptable image quality without exceeding specific system limitations such as maximum power or maximum current. Hence, an initial high luminance provides an initial pleasing performance, particularly in high-ambient illumination surrounds such as those found in typical retail commercial establishments. When placed in a customer's home, where ambient illumination is typically much lower, an LED device luminance that diminishes over time is accepted in order to achieve the longer lifetime associated with this lower luminance. While it is possible for the first rate of luminance decrease managed during the first period (e.g. pre-purchase in a commercial context) to be less than the rate of decrease during the second period (e.g. after purchase in a consumer context), it may be more useful to allow the initial luminance during the first period to decrease more rapidly than during the second period, so as to maintain the lifetime of the LED device at a nominal luminance less than the initial luminance.

Figure 2:
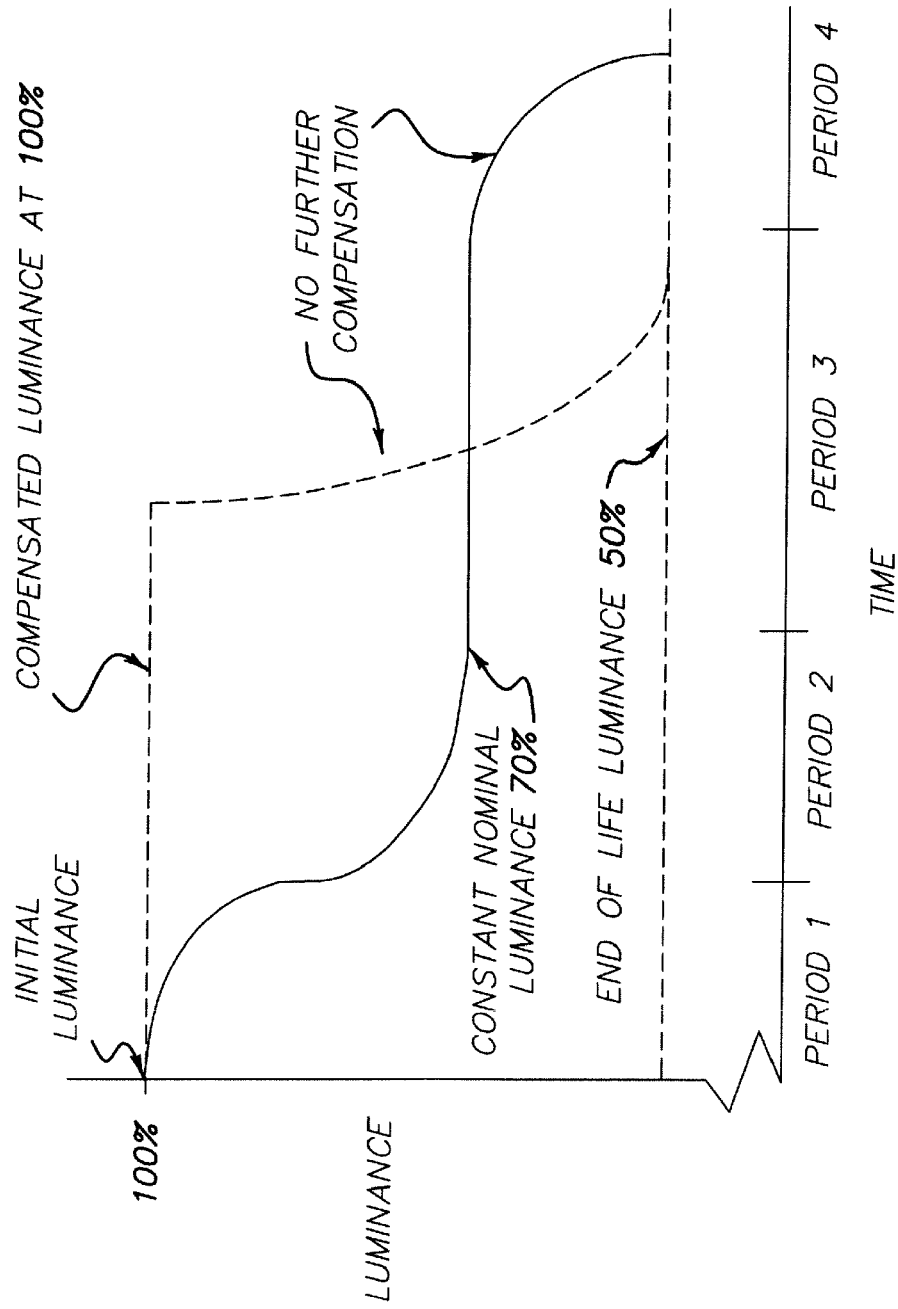
FIG. 2 is a graph illustrating the luminance over time for an embodiment of the present invention.

Referring to FIG. 2, a hypothetical LED device according to an embodiment of the present invention has an initial luminance rated at 100%. As shown with the dashed line, it is possible to maintain the initial luminance for some time, until the system can no longer provide adequate compensation to the device and its luminance decreases until the device fails. Alternatively, according to the present invention and as shown with the solid line, the luminance is allowed to decrease slowly during the first period. During a second period the luminance decreases more rapidly until it reaches a nominal level (e.g. 70% of the original luminance). The nominal luminance is maintained at a constant level during a third period until the system can no longer provide adequate compensation to the device (period four) and its luminance decreases until the device fails. As illustrated in the graph and demonstrated by applicants, such a compensation profile actually has a longer lifetime (before failure) than either an uncompensated LED device (not shown) or the compensation shown by the dashed line. (In this graph and the following graphs, the abscissa is not drawn to scale and does not represent linear increments of time.)

Figure 3:
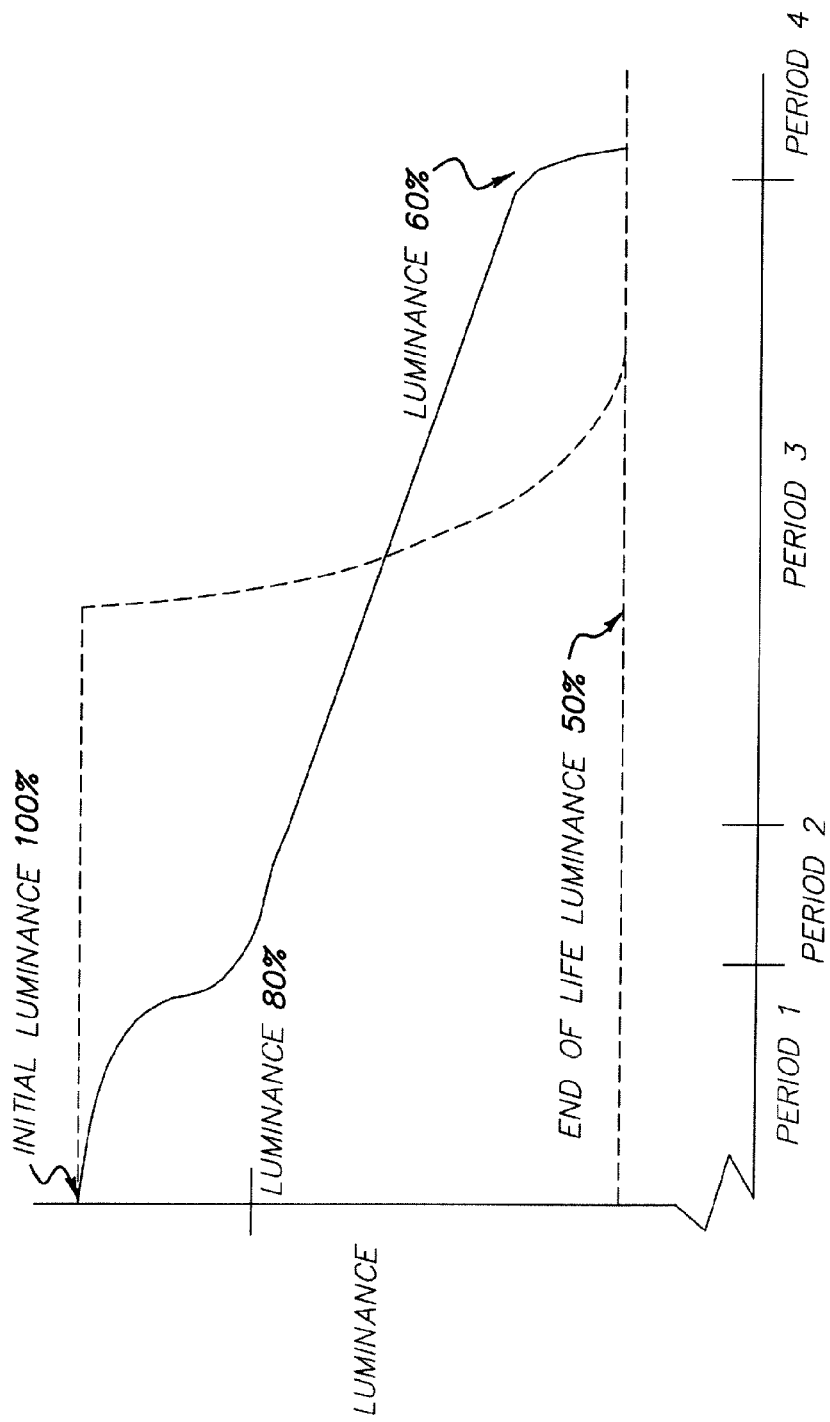
FIG. 3 is a graph showing a hypothetical aging compensation profile for an LED device according to an embodiment of the present invention.

Referring to FIG. 3, an alternative hypothetical LED device according to an alternative embodiment of the present invention has an initial luminance rated at 100%. As shown with the dashed line, it is possible to maintain the initial luminance for some time, until the system can no longer provide adequate compensation to the device and its luminance decreases until the device fails. Alternatively, according to the present invention and as shown with the solid line, the luminance is allowed to decrease slowly during the first period. During a second period the luminance decreases more rapidly, until it reaches a nominal level (e.g. 80% of the original luminance). The nominal luminance is gradually decreased during a third period, until the system can no longer provide adequate compensation to the device (e.g. at 60% initial luminance, period four) and its luminance decreases until the device fails. As illustrated in the graph and demonstrated by applicants, such a compensation profile actually may have a longer lifetime (before failure) than either an uncompensated LED device (not shown) or the compensation shown by the dashed line.

Figure 4:
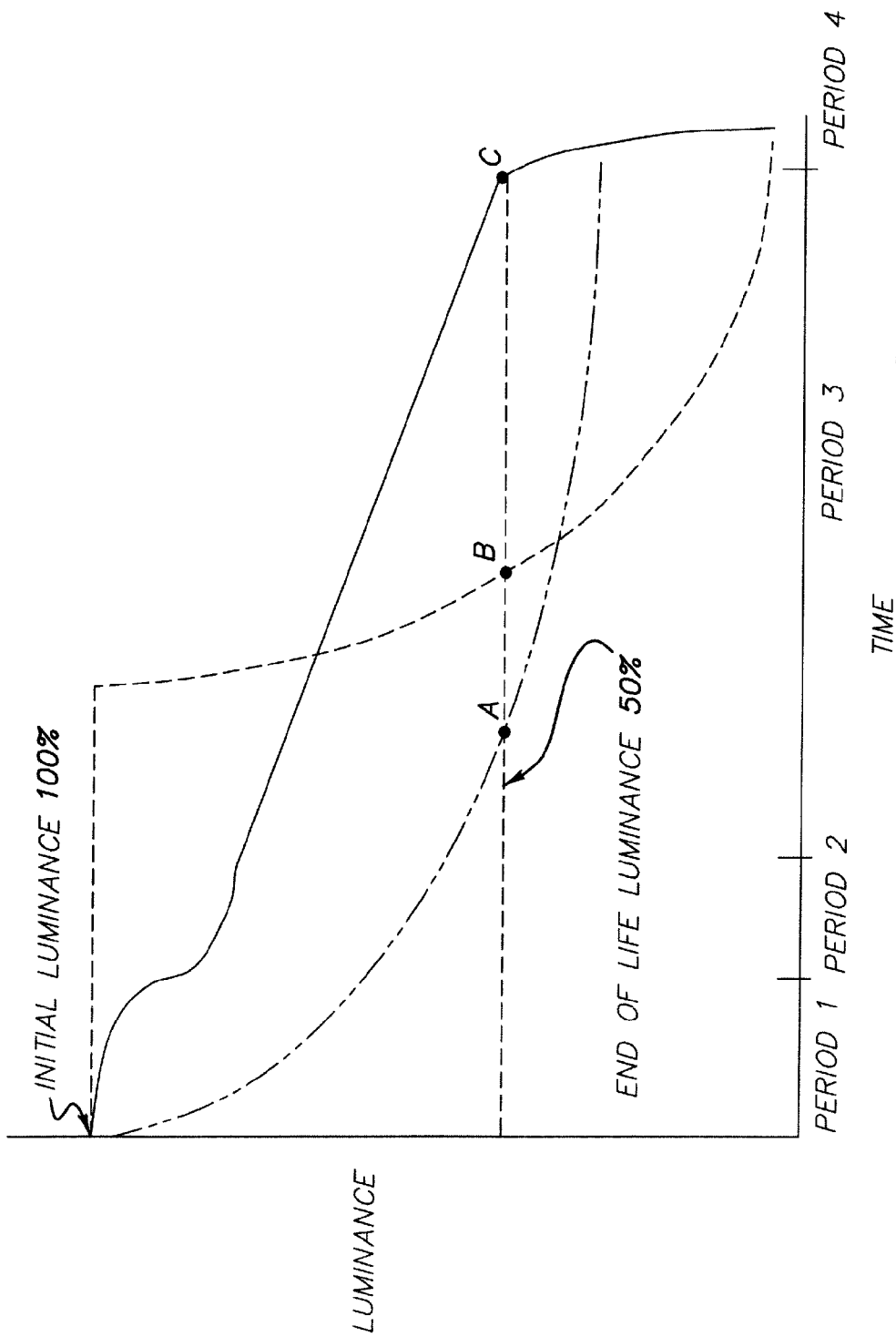
FIG. 4 is a graph showing a hypothetical aging compensation profile for an LED device according to another embodiment of the present invention.

FIG. 4 illustrates yet another hypothetical LED device according to an alternative embodiment of the present invention. In this embodiment, the nominal luminance is gradually decreased at a rate intended to reach a 50% luminance level and maximum compensation at the same time. As illustrated in the graph and demonstrated by applicants, such a compensation profile can have a longer lifetime ending at point C, than either an uncompensated LED device (dotted line ending at point A) or the compensation shown by the dashed line (point B).

Figure 5:
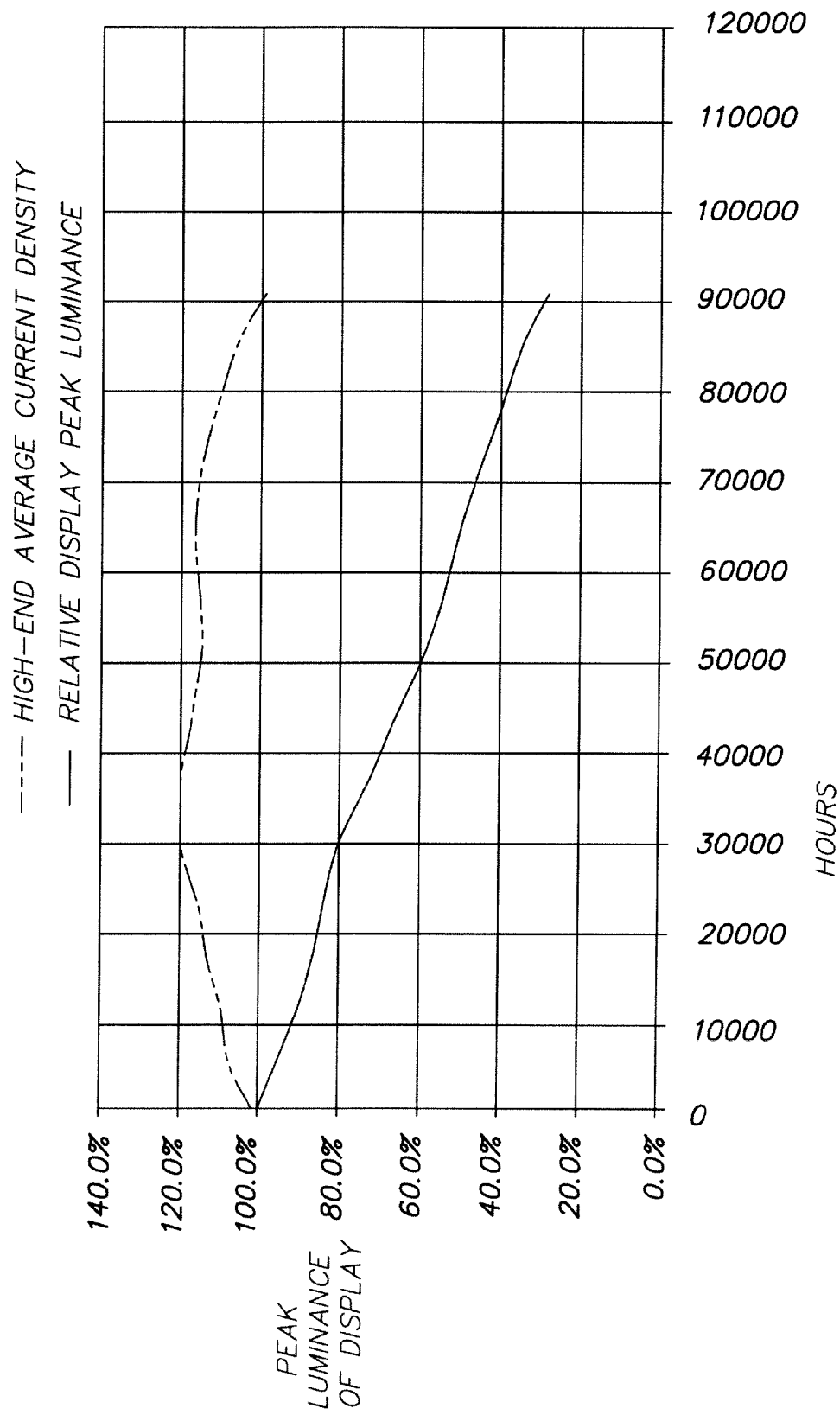
FIG. 5 is a graph showing a hypothetical aging compensation profile for an LED device according to an alternative embodiment of the present invention.

Referring to FIG. 5, a maximum system limit of 120% (i.e. an increase of 20% in current density above the current density required to drive the OLED display at the specified initial luminance) was adopted. The upper curve represents the average current density over time for pixels at the high-end of current consumption, while the lower curve represents the relative display peak luminance. As can be seen from this graph, during a first period the current density was increased to the maximum while the luminance decreased to approximately 80% at 30,000 hours of use. During a second period, the current density was actually decreased slightly and the luminance decreased slightly more rapidly down to 60% at about 50,000 hours of use. During a third period, the current density slightly increased and the luminance decreased slightly more rapidly to 50% at about 65,000 hours of use. During a fourth period, the current density and luminance of the device decreased at a nominal rate.

Figure 6:
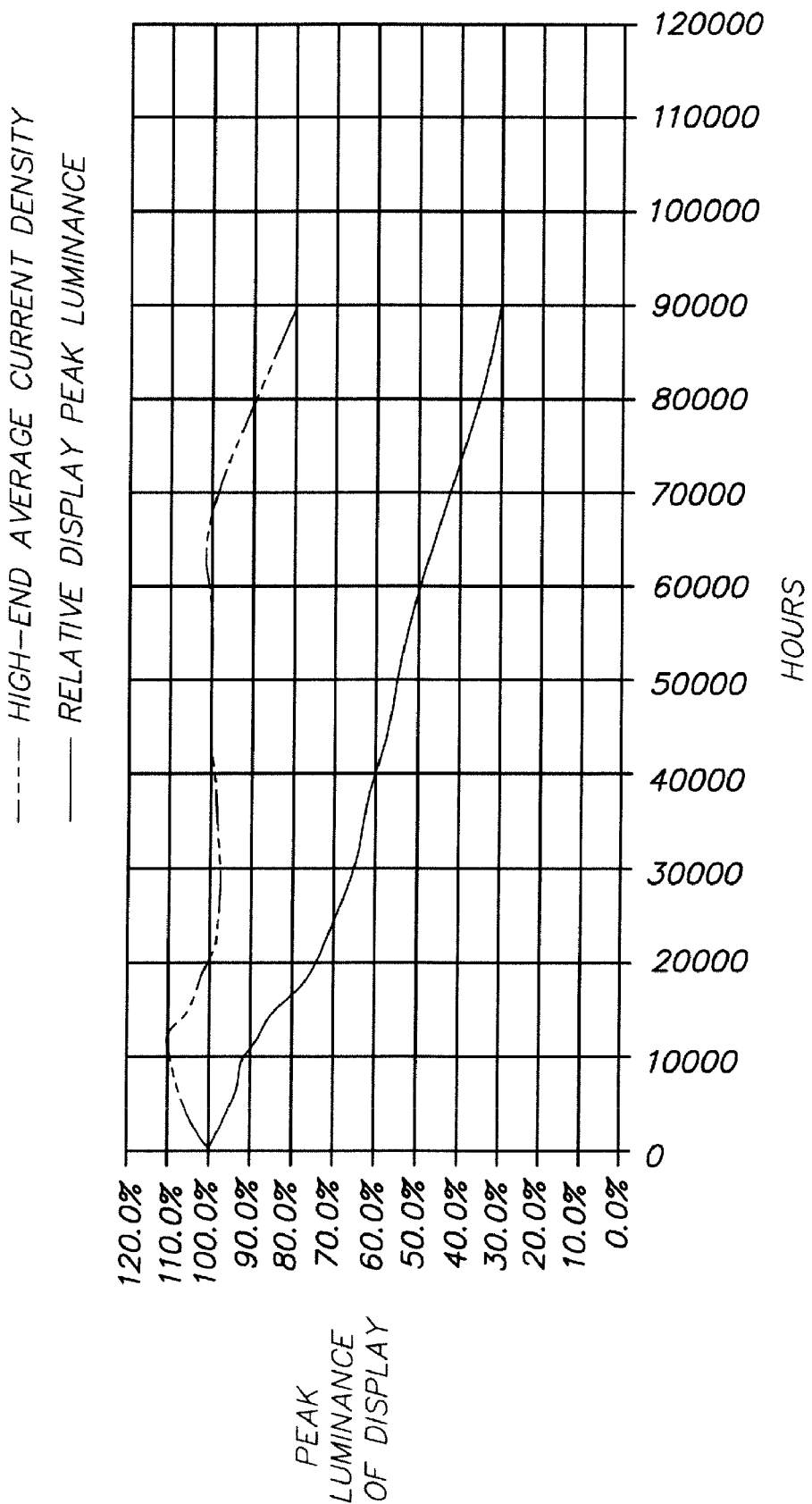
FIG. 6 is a graph illustrating the performance of an LED device employing an alternative embodiment of the present invention.
Figure 7:
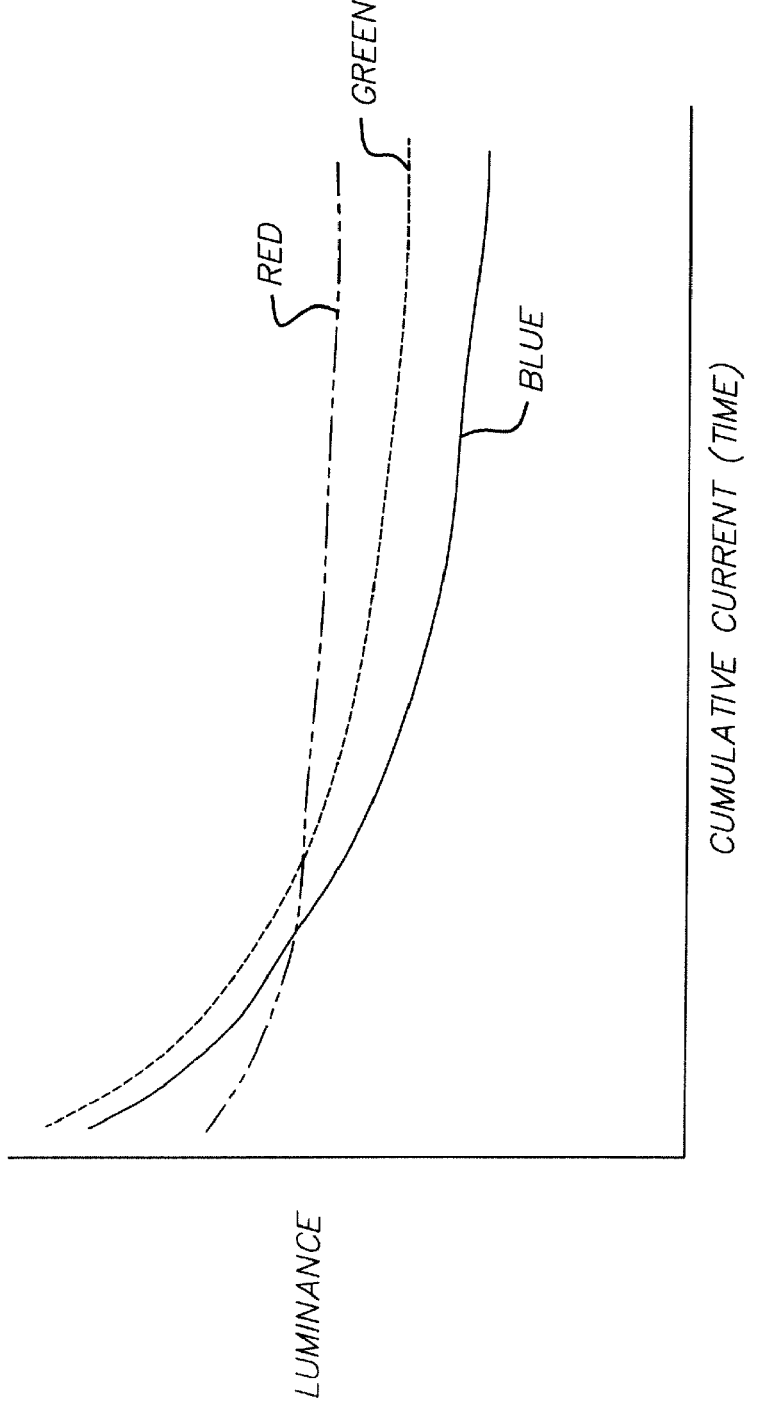
FIG. 7 is a graph showing typical aging characteristics for differently colored OLEDs in a prior-art display.
Figure 8:
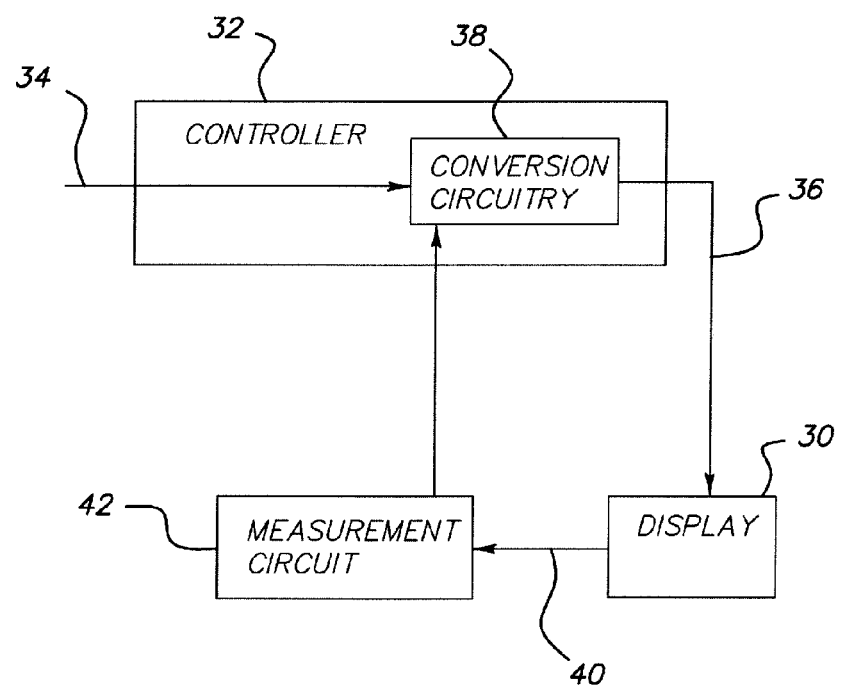
FIG. 8 is a schematic diagram of a display device with feedback and control circuits according to the prior-art and useful for the present invention.

Referring to FIG. 6, in a more strongly controlled example, a maximum system limit of 110% (i.e. an increase of 10% in current density above the current density required to drive the OLED display at the specified initial luminance) was adopted. The upper curve represents the current density over time for pixels at the high end of current consumption, while the lower curve represents the relative display peak luminance. As can be seen from this graph, during a first period the current density was increased to the maximum while the luminance decreased to approximately 90% at 11,000 hours. During a second period, the current density was actually decreased significantly to less than the initial current density and the luminance decreased more rapidly down to 70% at about 25,000 hours. During a third period, the current slightly increased and the luminance decreased slightly less rapidly to 50% at about 65,000 hours. During a fourth period, the current decreased, along with the luminance.

In these examples, further constraints were employed, for example, limiting the rate of change and the minimum time required for each 10% reduction in peak luminance. These constraints help to make the changes less perceptible to a viewer over time. Moreover, it is helpful to make the controlled luminance profile continuously differentiable, so as to avoid abrupt changes in output. (Note that 50,000 hours is roughly a 20-year lifetime for a television.) A wide variety of other constraints may be employed. For example, the first compensation signal may allow the luminance of the LED device to change at a first rate during the first period and the second compensation signal may allow the luminance of the LED device to change at a second rate different from the first rate during the second period. Alternatively, the first compensation signal may allow the luminance of the LED device to decrease at a first rate during the first period and the second compensation signal may allow the luminance of the LED device to be maintained at a constant luminance value during the second period. Any of the compensation signals may maintain the LED device at a constant average luminance.

The periods may be defined by the relative luminance of the LED device at the beginning and end of the respective period. Alternatively, the end of a period may be specified by the current, voltage, or power provided to the LED device or when a maximum current, voltage, or power is supplied to the LED device (as shown in FIGS. 5 and 6, period one).

Figure 9:
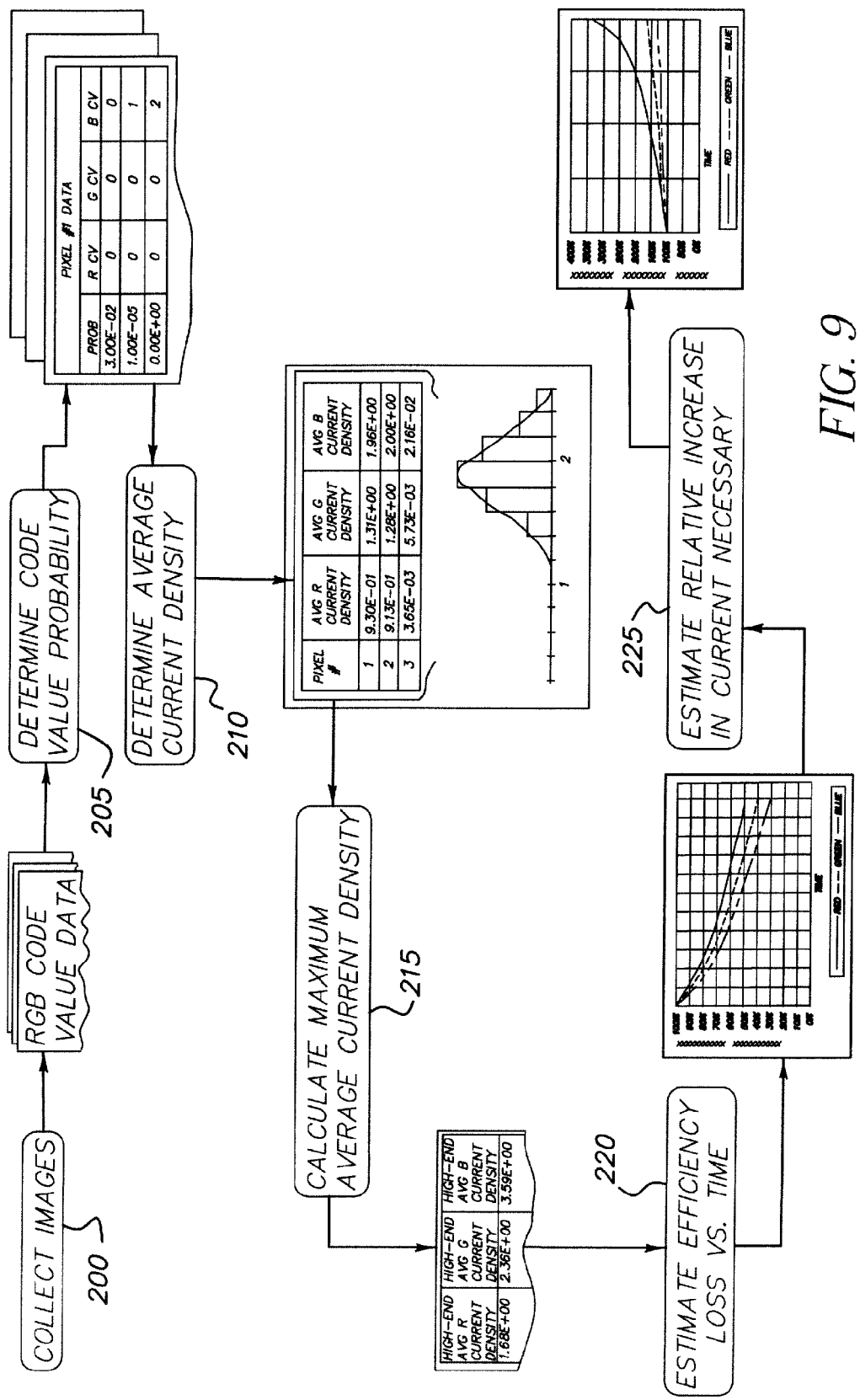
FIG. 9 is a schematic diagram of a design process for lifetime management useful for the present invention.

According to the present invention, a wide variety of periods and compensation profiles may be employed and a preferred choice is likely to depend on the device application. Such applications typically have a usage profile and design limitations that can be determined. The usage profile can include a collection of typical images and frequency and duration of image display and device use. The design limitations typically dictate the size of the device, pixel fill factor, and maximum driving-transistor size and current. Referring to FIG. 9, in order to design a suitable compensation profile for a specific device and application, it is helpful to first collect 200 application-related images of the desired device resolution and then analyze the collected images to determine 205 the probability of each pixel (or representative sample of pixels) displaying each RGB code value (driving signal value). Once the probability of occurrence of a driving code value for the application and design of interest, the average current density is determined 210 for each pixel. This current density can be used to predict efficiency loss over time for each pixel element. Note that not every pixel will be subject to the same average current densities. This is based on the image set analyzed and the location of the pixel on the display. For example, blue pixels near the top of the display may have higher average current densities than those on the bottom of the display if the image set has many scenes with sky near the top of the image. Hence, mean and standard deviation of the individual sub-pixel average current densities may be calculated 215 and an average current density for the most-heavily used pixels is chosen. The compensation method would then be designed to compensate for these most-heavily used (or "high-end") pixels. If there are any pixels used more than the high-end sub-pixels, they could not be fully compensated during the full lifetime of the device. In an embodiment of the present invention having a normal distribution of pixel average current densities, those pixels falling within the mean plus two sigma may be compensated, with pixels having average current densities above the mean plus two sigma level not capable of being fully compensated during the entire display life. The maximum current density allowed is thus determined as the maximum of the pixel element average current densities that the compensation method will allow. The efficiency loss for each sub-pixel color based on the maximum average current density (for each color) is estimated 220 based on previously measured experimental data. The efficiency loss calculation may then be employed to estimate 225 the relative increase in current that would be needed to maintain a constant light output from each color sub-pixel. Depending on the application needs, the estimated relative current increase may be employed or some other current increase either larger or smaller. Note that higher current densities will, in effect, cause an increased rate of aging.

If there was no limit on the amount of current that could be applied, the device could be driven for a very long time without a reduction in light output. However, as noted, any practical system has a limitation on the amount of current that can be supplied, thereby forcing a system to have a finite lifetime. It is difficult to design driver electronics that can deliver very large currents; hence, there is a practical limit on compensation. It is also true that larger currents require larger driving electronics, for example thin-film transistors, reducing the device aperture ratio and further increasing current density and reducing lifetime. At higher current densities, more heat is also generated, further reducing lifetimes. Moreover, the light-emitting materials that age fastest, will typically be limited first, for example with OLED materials that may be the blue sub-pixel.

Hence, according to the present invention, between the start and end of life, the peak luminance of the LED device is managed to keep relative current densities in the individual sub-pixels below a selected limit—with particular attention paid to the sub-pixels that run at the maximum average current densities. When managing the profile of device peak luminance vs. time, constraints may be placed on the following: maximum relative current density for the maximum average sub-pixels at any time (to deliver the desired display peak luminance); maximum relative current density for the maximum average sub-pixels that depend on the age of the display (in terms of hours used); maximum relative current density for the maximum average sub-pixels that depend on the estimated amount of TFT voltage threshold shift for these sub-pixels; maximum rate of change of the display peak luminance over time; and maximum rates of change of the LED device peak luminance that depend on the age of the display.

By employing these constraints within the context of the present invention, the peak luminance of the LED device may be reduced over time, in an acceptable manner, without exceeding a specified limit on the relative current densities for the device pixels.

Figure 10A:
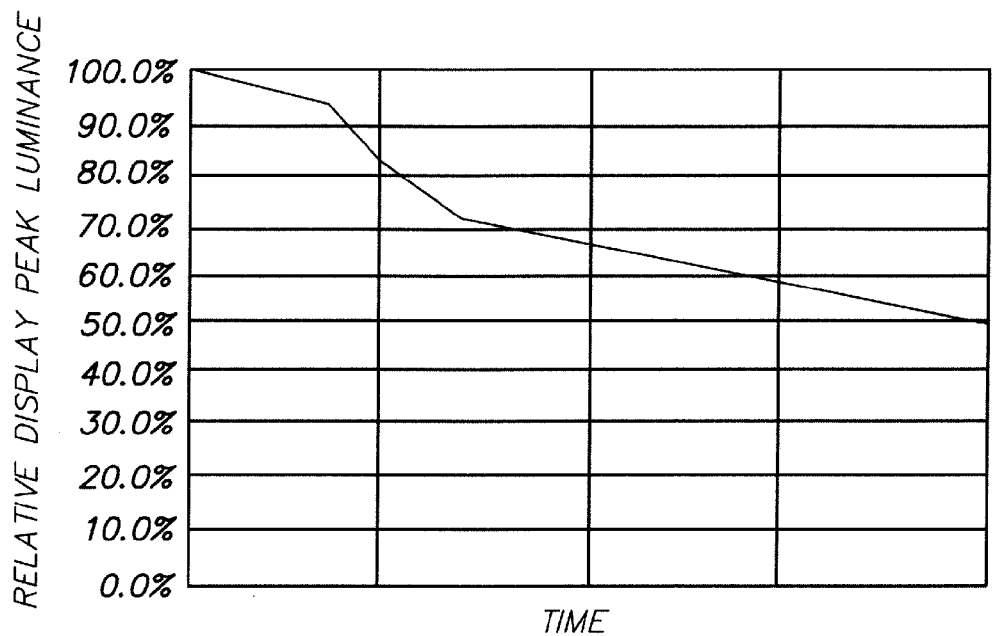
FIGS. 10A-C are graphs depicting the performance of a device when controlled according to a method of the present invention.
Figure 10B:
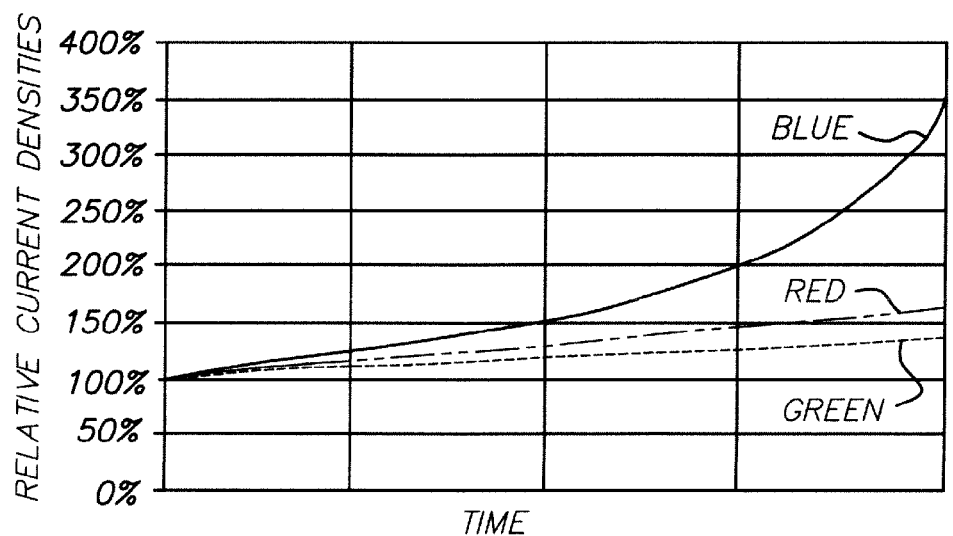
Figure 10C:
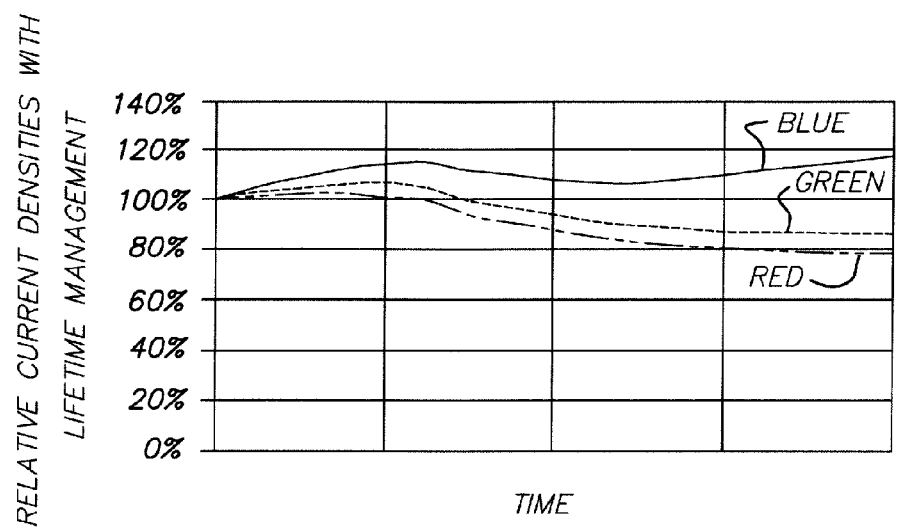

FIGS. 10A-C illustrate the effect of managing peak luminance over time on the pixel current densities in a device. FIG. 10B shows the relative current densities required to keep peak luminance constant at 100%. FIG. 10A shows one embodiment of the proactive management of peak luminance that was implemented to limit these peak current densities over the life according to the present invention. FIG. 10C shows the relative current densities that are required with the device peak luminance managed according to the present invention. Notice that the relative current densities for each color pixel were kept below 120% of the original when the peak luminance profile of the device was managed in this embodiment of the present invention.

When applied in full-color display devices, color light-emitting elements may be employed. In this case, different compensations may be provided for each group of light-emitting elements emitting different colors of light. Different compensations may also be applied to light emitting elements for different OLED display luminance levels.

The present invention can be employed in most top- or bottom-emitting LED device configurations. These include simple structures comprising a separate anode and cathode per LED and more complex structures, such as passive-matrix displays having orthogonal arrays of anodes and cathodes to form pixels, and active-matrix displays where each pixel is controlled independently, for example, with a thin film transistor (TFT). As is well known in the art, LED devices and light-emitting layers include multiple organic layers, including hole and electron transporting and injecting layers, and emissive layers. Such configurations are included within this invention.

In one embodiment, the invention is employed in a device that includes Organic Light Emitting Diodes (OLEDs) which are composed of small molecule or polymeric OLEDs as disclosed in, but not limited to U.S. Pat. No. 4,769,292, issued Sep. 6, 1988 to Tang et al., and U.S. Pat. No. 5,061,569, issued Oct. 29, 1991 to VanSlyke et al. Many combinations and variations of organic light emitting displays can be used to fabricate such a device.

The invention has been described in detail with particular reference to certain preferred embodiments thereof, but it will be understood that variations and modifications can be effected within the spirit and scope of the invention.

PARTS LIST 30 display
32 controller
34 image or data signal
36 control signal
38 conversion circuitry
40 feedback signal
42 measurement circuit
100 begin period step
105 measure change in output step
110 calculate compensation step
115 restrict compensation step
120 apply compensation step
125 test step
130 begin period step
135 measure change in output step
140 calculate compensation step 145 restrict compensation step
150 apply compensation step
155 test step
160 begin period step
199 end of life step
A, B, C end-of-life points in time
200 collect step
205 determine step
210 determine step
215 calculate step
220 estimate step
225 estimate step

What is claimed is:

1. A method for controlling and compensating aging in an LED device comprising the steps of:
   a) measuring a performance change in light output of the LED device;
   b) controlling the LED device with a first compensation algorithm derived from the measured performance change, during a first period, to effect a luminance change over time in the light output of the LED device; and
   c) controlling the LED device with a second compensation algorithm, derived from the measured performance change, different from the first compensation algorithm, during a second period, to effect a second luminance change over time in the LED device's light output; wherein the second luminance change over time in the second period is different from the first luminance change over time in the first period;
   wherein the first and second periods together are less than the lifetime of the LED device and
   wherein either step of controlling the LED device restricts the current, voltage, or power supplied to the LED device to less than that necessary to maintain a constant luminance over time.

2. The method claimed in claim 1 wherein either step of controlling the LED device reduces the current, voltage, or power supplied to the LED device.

3. The method claimed in claim 1 wherein the LED device is a display device or a lamp.

4. The method claimed in claim 1 wherein the LED device is an organic LED device.

5. The method claimed in claim 1 wherein no compensation algorithm is employed after the end of the second period.

6. The method claimed in claim 1 further employing a compensation algorithm after the second period until the LED device's light output fails.

7. The method claimed in claim 1 further comprising the step of controlling the LED device with a third compensation algorithm during a third period to effect a third luminance change over time in the LED device's light output.

8. The method claimed in claim I wherein the LED device is an inorganic LED device employing quantum dots.

9. The method claimed in claim 1 further comprising the step of measuring the performance change in the LED device a plurality of times during one or more periods.

10. The method claimed in claim 1 wherein the first compensation algorithm allows the luminance of the LED device to change at a first rate during the first period and the second compensation algorithm allows the luminance of the LED device to change at a second rate different from the first rate during the second period.

11. The method claimed in claim 1 wherein the first compensation algorithm allows the luminance of the LED device to decrease at a first rate during the first period and the second compensation algorithm allows the luminance of the LED device to be maintained at a constant luminance value during the second period.

12. The method claimed in claim 1 wherein either the first or second compensation algorithm maintains a constant average LED device luminance.

13. The method claimed in claim 1 wherein an end to the first or second period is specified by the relative luminance of the LED device at the beginning and end of the respective period.

14. The method claimed in claim 1 wherein an end to the first or second period is specified by a relative change in current, voltage, or power provided to the LED device, or when a maximum current, voltage, or power is supplied to the LED device.

15. The method claimed in claim 1 wherein the first or second compensation algorithm controls the device peak luminance versus time such that constraints are placed on the maximum relative current density for the maximum average sub-pixels at any time, the maximum relative current density for the maximum average sub-pixels that depend on the age of the display, the maximum rate of change of the display peak luminance over time, or the maximum rates of change of the LED device peak luminance that depends on the age of the display.

16. The method claimed in claim 1 wherein the compensation algorithm is selected from one or more of the group including a voltage applied to the display; a voltage applied to each pixel; a charge applied to each pixel; and a data value applied to each pixel.

17. The method claimed in claim 1 wherein the LED device is a color display comprising light-emitting elements, emitting different colors of light and where a different compensation algorithm controls each color of light-emitting element.

18. The method claimed in claim 1 wherein different compensation algorithms control the LED device at different LED device luminance levels.

19. A method for controlling and compensating aging in an LED device comprising the steps of:
   a) measuring a performance change in light output of the LED device;
   b) controlling the LED device with a first compensation algorithm derived from the measured performance change, during a first period, to effect a luminance change over time in the light output of the LED device;
   c) controlling the LED device with a second compensation algorithm, derived from the measured performance change, different from the first compensation algorithm, during a second period, to effect a second luminance change over time in the LED device's light output; wherein the second luminance change over time in the second period is different from the first luminance change over time in the first period; and
   d) controlling the LED device with a third compensation algorithm during a third period to effect a third luminance change over time in the LED device's light output; wherein the first and second periods together are less than the lifetime of the LED device.

* * * * *